United States Patent
Hsu et al.

(10) Patent No.: US 11,706,137 B2
(45) Date of Patent: *Jul. 18, 2023

(54) ROUTERS AND METHODS FOR TRAFFIC MANAGEMENT

(71) Applicant: Synology Inc., Taipei (TW)

(72) Inventors: Li-Fong Hsu, Taipei (TW);
Kuang-Ming Li, Taipei (TW);
Cheng-Pang Chang, Taipei (TW)

(73) Assignee: SYNOLOGY INC., Taipei (TW)

( * ) Notice: Subject to any disclaimer, the term of this patent is extended or adjusted under 35 U.S.C. 154(b) by 70 days.

This patent is subject to a terminal disclaimer.

(21) Appl. No.: 17/035,025

(22) Filed: Sep. 28, 2020

(65) Prior Publication Data

US 2021/0014162 A1    Jan. 14, 2021

Related U.S. Application Data

(63) Continuation of application No. 15/787,954, filed on Oct. 19, 2017, now Pat. No. 10,819,632.

(Continued)

(30) Foreign Application Priority Data

May 23, 2017    (CN) .......................... 201710367614.7

(51) Int. Cl.
*H04L 45/00*     (2022.01)
*H04L 47/24*     (2022.01)
(Continued)

(52) U.S. Cl.
CPC .............. *H04L 45/70* (2013.01); *H04L 43/18* (2013.01); *H04L 45/74* (2013.01); *H04L 47/193* (2013.01);
(Continued)

(58) Field of Classification Search
CPC ......... H04L 45/70; H04L 45/74; H04L 43/18; H04L 47/193; H04L 47/20; H04L 47/24;
(Continued)

(56) References Cited

U.S. PATENT DOCUMENTS 7,111,162 B1 *    9/2006    Bagepalli .............. H04L 63/166
                                                          709/227
7,218,610 B2      5/2007    Sivakumar et al.
(Continued)

FOREIGN PATENT DOCUMENTS

CN         105282029 A      1/2016
KR         10-0633120 B1    9/2006

OTHER PUBLICATIONS

Agrawal, H., et al.; "Accelerating network packet processing in Linux;" http://www.embedded.com/print/4403058; Dec. 2012; pp. 1-9.

(Continued)

*Primary Examiner* — Jasper Kwoh
(74) *Attorney, Agent, or Firm* — Birch, Stewart, Kolasch & Birch, LLP

(57) ABSTRACT

A router including a communication device, a first processor, and a second processor. The communication device is configured to receive a plurality of first packets of a connection and at least one second packet of the connection subsequent to the first packets The first processor, coupled to the communication device, and configured to analyze the first packets to determine at least part of a plurality of transport-layer parameters associated with the connection, receive a traffic control rule associated with the connection, and offload processing of the at least one second packet of the connection to a second processor after the at least part of the transport-layer parameters is determined. The second processor is configured to perform traffic control on the second (Continued)

packet according to the traffic control rule and the at least part of the transport-layer parameters.

12 Claims, 7 Drawing Sheets

Related U.S. Application Data

(60) Provisional application No. 62/447,463, filed on Jan. 18, 2017.

(51) Int. Cl.
*H04L 47/193* (2022.01)
*H04L 45/74* (2022.01)
*H04L 43/18* (2022.01)
*H04L 9/40* (2022.01)
*H04L 47/20* (2022.01)
*H04L 47/2475* (2022.01)

(52) U.S. Cl.
CPC .............. *H04L 47/20* (2013.01); *H04L 47/24* (2013.01); *H04L 63/1408* (2013.01); *H04L 47/2475* (2013.01); *H04L 63/1416* (2013.01)

(58) Field of Classification Search
CPC ............. H04L 47/2475; H04L 63/1408; H04L 63/1416
See application file for complete search history.

(56) References Cited

U.S. PATENT DOCUMENTS

| | | | |
|---|---|---|---|
| 7,222,190 B2 | 5/2007 | Klinker et al. | |
| 7,426,181 B1 | 9/2008 | Feroz et al. | |
| 9,160,765 B1 | 10/2015 | Mehta et al. | |
| 9,319,362 B1 | 4/2016 | McAllister et al. | |
| 2003/0145077 A1 | 7/2003 | Khan et al. | |
| 2003/0235194 A1* | 12/2003 | Morrison | H04L 45/583 370/389 |
| 2005/0147032 A1 | 7/2005 | Lyon et al. | |
| 2006/0013211 A1 | 1/2006 | Deerman et al. | |
| 2008/0263191 A1 | 10/2008 | Shah et al. | |
| 2014/0269298 A1* | 9/2014 | Lu | H04L 49/505 370/235 |
| 2014/0379915 A1 | 12/2014 | Yang et al. | |
| 2015/0163197 A1 | 6/2015 | Pratapa et al. | |
| 2015/0365286 A1* | 12/2015 | Folco | G06F 15/161 709/224 |
| 2016/0149817 A1 | 5/2016 | Tanida et al. | |
| 2018/0212845 A1 | 7/2018 | Eriksson et al. | |

OTHER PUBLICATIONS

Wang, Z.; "The Applications of Deep Learning on Traffic Identification;" 2015; pp. 1-10.

Bujlow, T., et al.; "Independent Comparison of Popular DPI Tools for Traffic Classification;" Preprint submitted to Computer Networks; Nov. 2014; pp. 1-14.

European Search Report dated Jun. 11, 2018, issued in application No. 17201972.1-1215.

Zhang, Y., et al.; "On wide area network optimization;" IEEE Communications Surveys & Tutorials; vol. 14; No. 4 2012; pp. 1090-1113.

* cited by examiner

ROUTERS AND METHODS FOR TRAFFIC MANAGEMENT

CROSS REFERENCE TO RELATED APPLICATIONS

This Application is a Continuation of U.S. application Ser. No. 15/787,954, filed on Oct. 19, 2017, which claims priority of U.S. Provisional Application No. 62/447,463, filed on Jan. 18, 2017, the entirety of which is incorporated by reference herein. Also, this Application claims priority of China Application No. 201710367614.7, filed on May 23, 2017, the entirety of which is incorporated by reference herein.

BACKGROUND OF THE APPLICATION

Field of the Application

The application relates generally to traffic control and traffic monitoring for routers, and more particularly, to traffic control and traffic monitoring for routers with dual controllers.

Description of the Related Art

In typical network planning, networks are categorized into Local Area Networks (LANs) and Wide Area Networks (WANs) for optimization of network efficiency. Routers are commonly adopted as bridges to connect LANs and WANs. A router is a networking device which provides the function of packet forwarding and routing, in which the term "routing" generally refers to the process of determining end-to-end paths that data packets take from source to destination, while the term "forwarding" generally refers to the process of transferring the packet from an input link interface to the appropriate output link interface. With the deployment of routers between LANs and WANs, communications between any nodes in the LANs and WANs may be realized.

Due to growing demand for traffic management, many routers nowadays further support the functions of traffic control and traffic monitoring. However, such routers need to run a complicated analysis on each data packet for providing adequate traffic control and traffic monitoring.

As shown in FIG. 1, the Open System Interconnection (OSI) model partitions a communication system into 7 abstraction layers, wherein each layer performs a respective processing of data packets to provide a certain function or to meet a certain requirement. FIG. 1 also depicts a schematic process of how a data packet is delivered in the networks, wherein the data packet is encapsulated in each layer at the sender so that the data packet can be delivered to the correct receiver. Assuming that an application needs to send data, the Transport layer at the sender includes protocol (e.g., Transmission Control Protocol (TCP), User Datagram Protocol (UDP), or Internet Control Message Protocol (ICMP)) information in the header of each data packet to be transmitted (also called Transmission (Tx) data packet), so that each data packet may be delivered to the proper application at the receiver. Subsequently, the Network layer includes information of the source Internet Protocol (IP) address and the destination IP address in the header of each data packet, so that the data packets may be delivered to the correct destination. Lastly, the Physical layer converts each data packet into the transmission format of the physical networks (e.g., Ethernet), so that the data packets may be delivered in various physical media.

Likewise, as shown in FIG. 2, a route needs to analyze each incoming data packet one layer at a time to know the detailed information about each incoming data packet. For traffic control/monitoring, the header of each data packet needs to be analyzed to obtain the source IP address with which the router may identify exactly where the data packet comes from. Also, during the processing in the Application layer, each data packet is analyzed to identify which protocol is used in the Application layer. For instance, the protocol used in the Application layer may be Telnet, and the analyzed data packet may include application data, such as Bulletin Board System (BBS) data, which is in compliance with the Telnet protocol.

However, the layer-by-layer analysis of each data packet inevitably results in a heavy burden on the Central Processing Unit (CPU) of a router. Therefore, it is desirable to have a more robust method of traffic management, which may efficiently reduce the burden on the CPU of the router and enhance the throughput of the router.

BRIEF SUMMARY OF THE APPLICATION

In order to solve the aforementioned problem, the present application proposes routers with dual controllers and traffic management methods thereof, in which the secondary controller is used to share the loading of the primary controller (e.g., a CPU) with respect to traffic control and traffic monitoring, thereby improving the throughput of the router and reducing the burden on the primary controller to allow the primary controller to take care of other tasks concerning more advanced network services.

In one aspect of the application, a router comprising a communication device, a first controller, a storage device, and a second controller is provided. The communication device is configured to receive a plurality of first packets of a connection and at least one second packet of the connection subsequent to the first packets. The first controller is configured to analyze the first packets to determine a plurality of transport-layer parameters associated with the connection. The storage device is configured to store the transport-layer parameters. The second controller is configured to perform traffic management on the second packet according to at least part of the transport-layer parameters in the storage device.

In another aspect of the application, the traffic management method for a router comprising a first controller and a second controller is provided. The traffic management method comprises the following steps: receiving a plurality of first packets of a connection and at least one second packet of the connection subsequent to the first packets; analyzing, by the first controller, the first packets to determine a plurality of transport-layer parameters associated with the connection; storing the transport-layer parameters in a storage device; and performing, by the second controller, traffic management on the second packet according to at least part of the transport-layer parameters in the storage device.

Other aspects and features of the application will become apparent to those with ordinary skill in the art upon review of the following descriptions of specific embodiments of the routers and traffic management methods.

BRIEF DESCRIPTION OF THE DRAWINGS

The application can be more fully understood by reading the subsequent detailed description and examples with references made to the accompanying drawings, wherein.

DETAILED DESCRIPTION OF THE APPLICATION

The following description is made for the purpose of illustrating the general principles of the application and should not be taken in a limiting sense. It should be understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Figure 1:
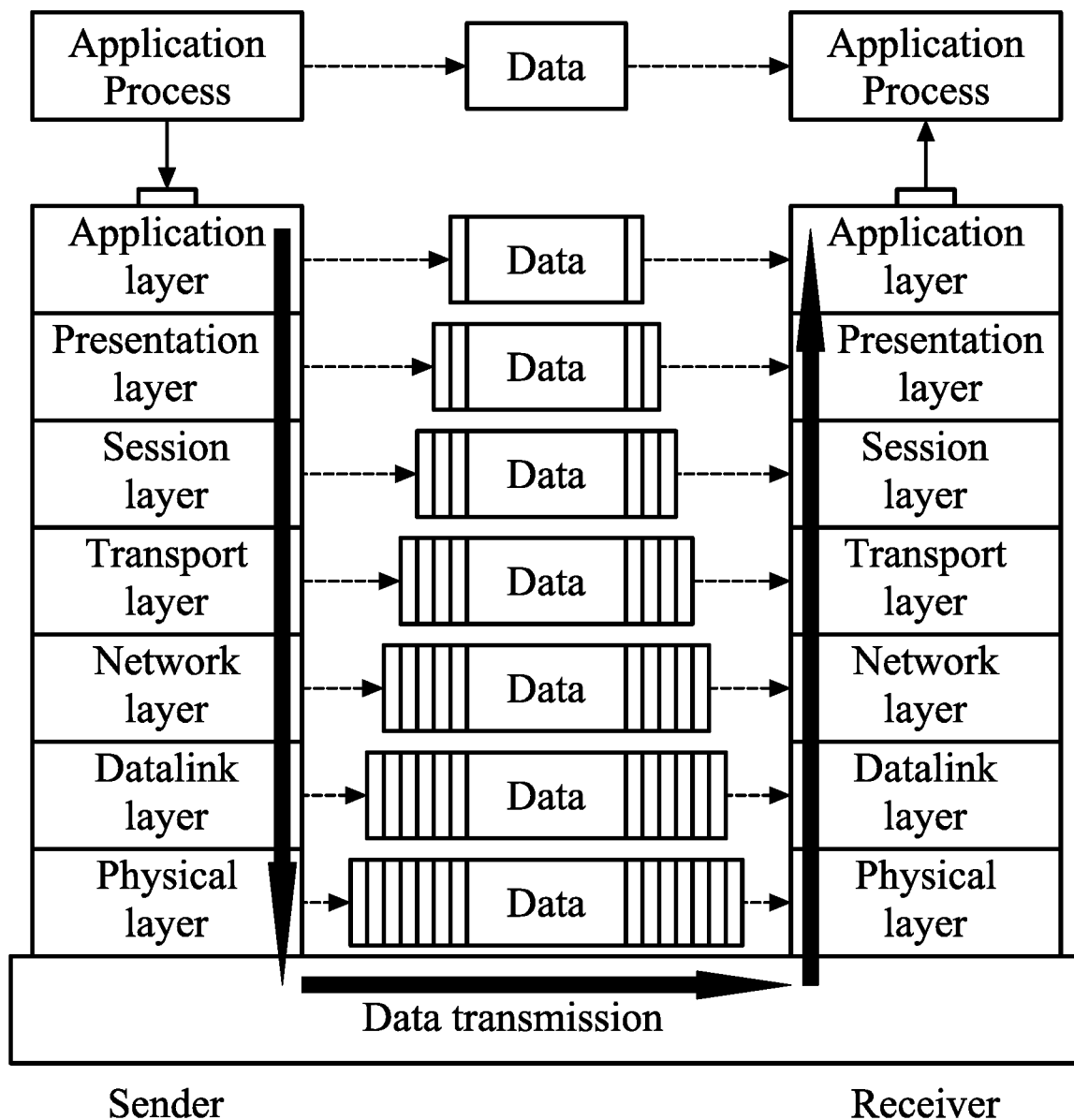
FIG. 1 is a schematic diagram illustrating the OSI model for network communications.
Figure 2:
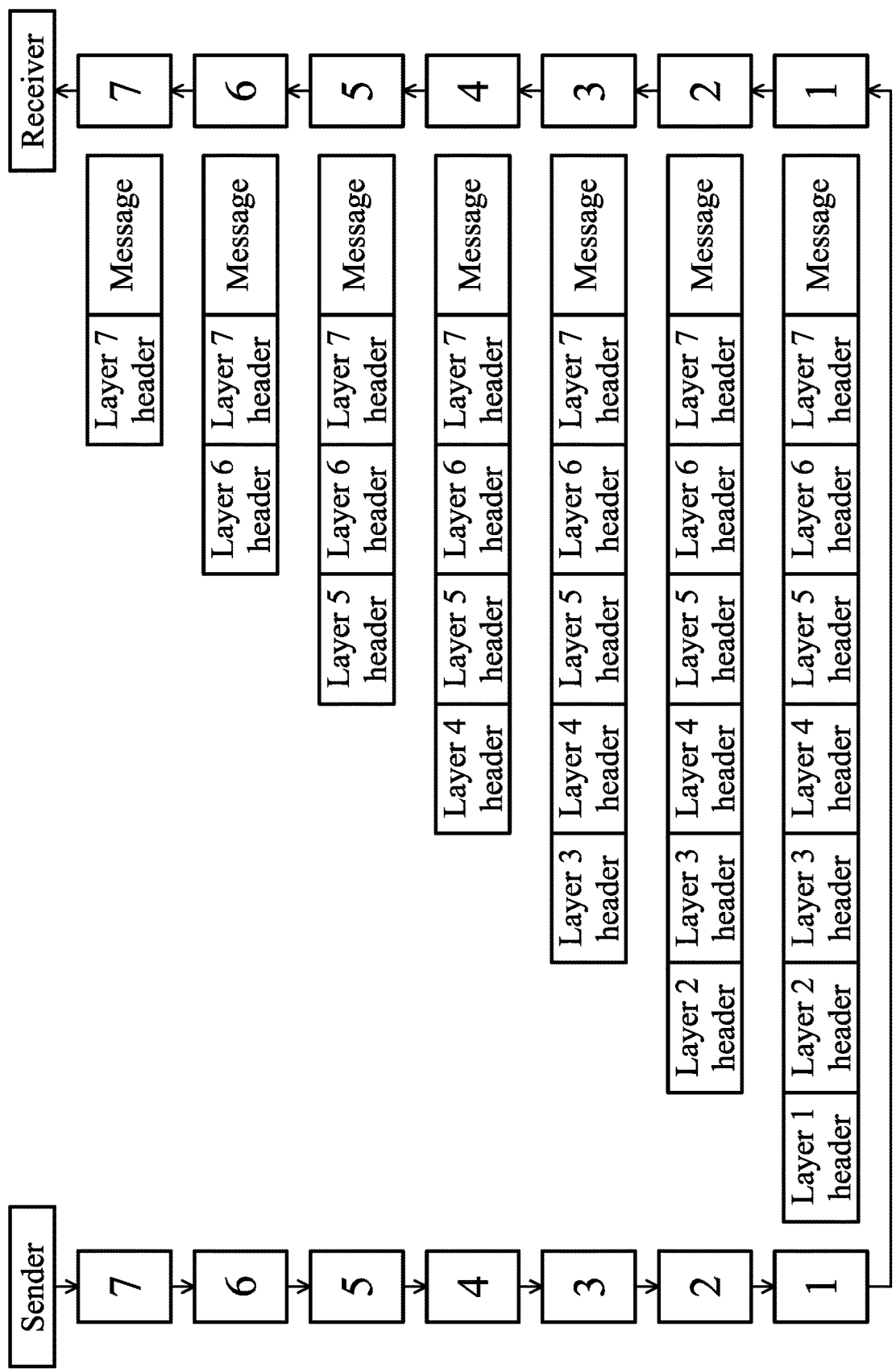
FIG. 2 is a schematic diagram illustrating the packet analyses in 7 layers of the OSI model for network communications.
Figure 3:
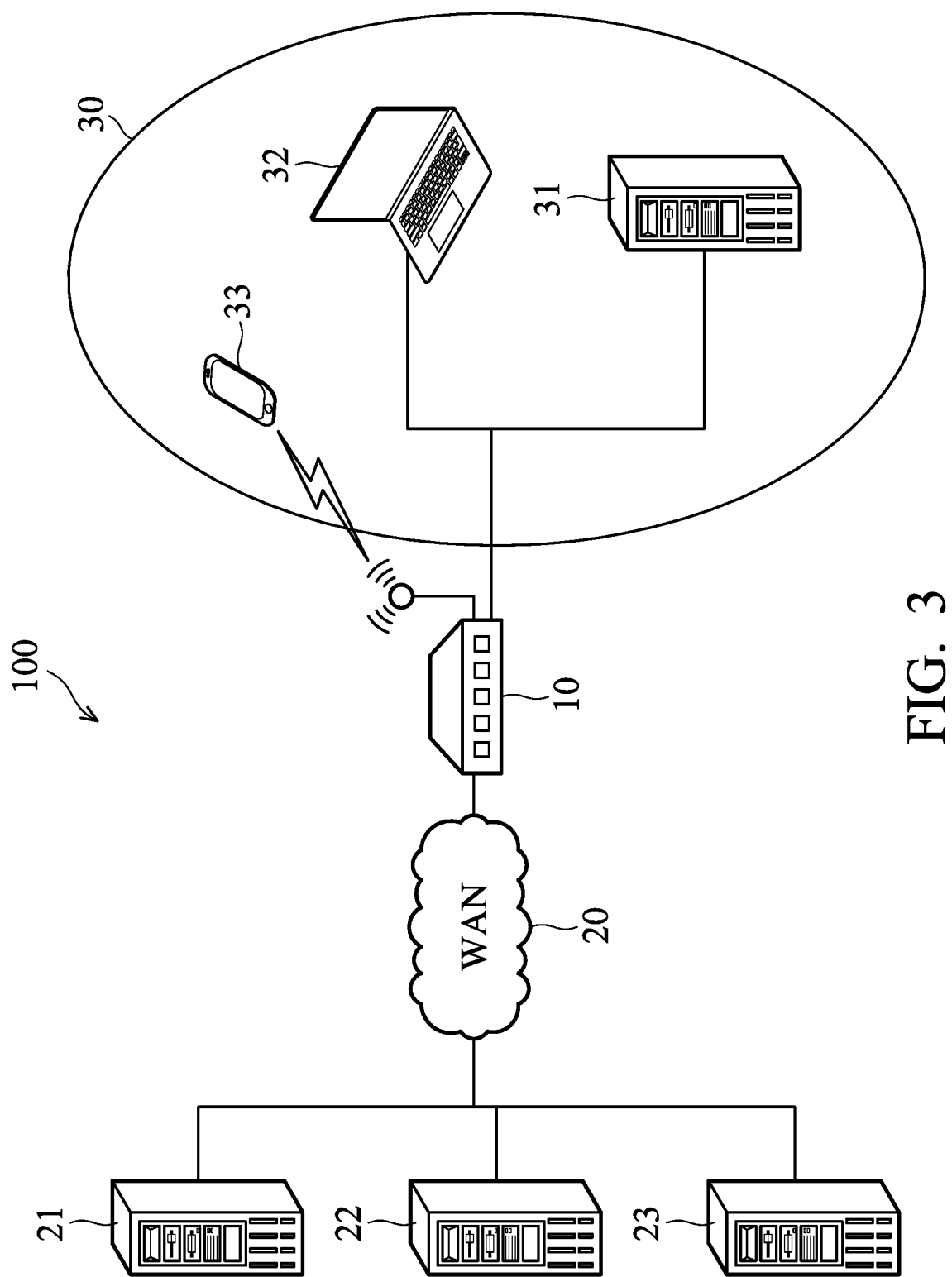
FIG. 3 is a schematic diagram illustrating a network environment according to an embodiment of the application.

FIG. 3 is a schematic diagram illustrating a network environment according to an embodiment of the application. The network environment 100 includes a router 10, a WAN 20, and a LAN 30, in which the LAN 30 is connected to the WAN 20 through the router 10.

The WAN 20 may also be called an external network or a public network, which may include telecommunication network(s), optical network(s), and/or Asymmetric Digital Subscriber Line (ADSL) network(s). The WAN 20 generally spans a wild range from tens of kilometers to thousands of kilometers. For example, the WAN 20 may cover areas, cities, and/or countries which may be connected via the Internet.

There are network communication devices 21-23 disposed on the WAN 20, in which each of the network communication devices 21-23 may be a notebook PC, a desktop computer, a workstation, a server, a smartphone, or panel PC, etc. For example, any one of the network communication devices 21-23 may be a server configured to provide services or applications, such as E-mail service, mobile push service, website service, or short message service.

The LAN 30 may also be called an internal network or a private network, which may include Ethernet(s), twisted-pair cable network(s), and/or coaxial cable networks. The LAN 30 generally covers a small area, such as an office or a floor of a building.

There are user devices 31-33 disposed on the LAN 30, in which each of the user devices 31-33 may be a notebook PC, a desktop computer, a smartphone, a panel PC, a workstation, a server, or any consumer electronic device with a wired/wireless communication function.

The router 10 is responsible for connecting the WAN 20 and the LAN 30. Specifically, the router 10 provides the functions of packet routing and forwarding to enable the communications between the network communication devices 21 to 23 and the user devices 31 to 33. In addition, the router 10 provides the function of traffic management, including traffic control and traffic monitoring applied to the routed/forwarded data packets.

In one embodiment, the traffic control may be applied to certain data packet(s). For example, the traffic control may refer to limiting the data transfer rate from a certain source IP address, or blocking data packets from that source IP address.

In one embodiment, the traffic monitoring may be applied to collect statistics and information of data packets that meet a certain condition. For example, the statistics may include the data throughput, such as the total packet count and/or total packet size (in bytes), of a certain application. With the collected statistics and information, users may query the data throughput of a certain application, a certain web site, or a certain user device.

Figure 4:
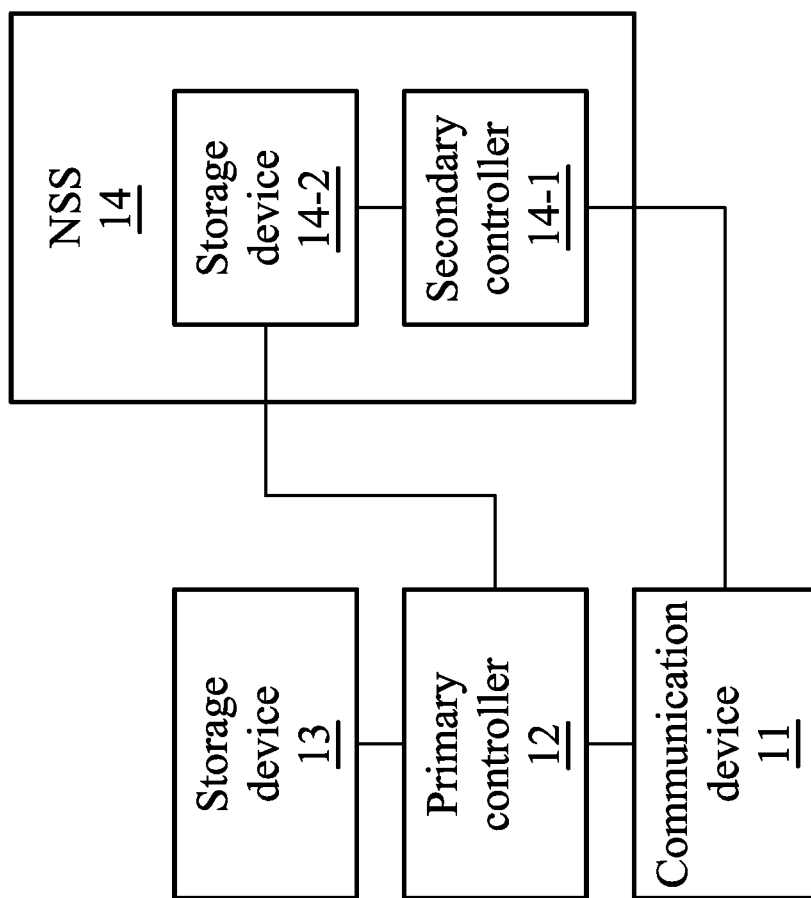
FIG. 4 is a block diagram illustrating the hardware architecture of the router 10 according to an embodiment of the application.

FIG. 4 is a block diagram illustrating the hardware architecture of the router 10 according to an embodiment of the application. The router 10 includes a communication device 11, a primary controller 12, a storage device 13, and a Network Subsystem (NSS) 14.

The communication device 11 is responsible for providing network connections to the WAN 20 (including the network communication devices 21 to 23 on the WAN 20) and the LAN 30 (including the user device 31 to 33 on the LAN 30). The communication device 11 may provide the network connections using a wired/wireless communication technology, such as the Ethernet technology, Wireless Fidelity (Wi-Fi) technology, Global System for Mobile communications (GSM) technology, General Packet Radio Service (GPRS) technology, Enhanced Data rates for Global Evolution (EDGE) technology, Wideband Code Division Multiple Access (WCDMA) technology, Code Division Multiple Access 2000 (CDMA-2000) technology, Time Division-Synchronous Code Division Multiple Access (TD-SCDMA) technology, Worldwide Interoperability for Microwave Access (WiMAX) technology, Long Term Evolution (LTE) technology, or Time-Division LTE (TD-LTE) technology.

In one embodiment, the communication device 11 may include an Ethernet card for providing the function of wired communications. In another embodiment, the communication device 11 may include a wireless transceiver for providing the function of wireless communications, wherein the wireless transceiver may include a baseband device, a Radio Frequency (RF) device, and an antenna. The baseband processing device may contain multiple hardware components to perform baseband signal processing, including Analog-to-Digital Conversion (ADC)/Digital-to-Analog Conversion (DAC), gain adjusting, modulation/demodulation, encoding/decoding, and so on. The RF device may receive RF wireless signals via the antenna, convert the received RF wireless signals into baseband signals, which are processed by the baseband processing device, or receive baseband signals from the baseband processing device and convert the received baseband signals into RF wireless signals, which are later transmitted via the antenna. The RF device may also contain multiple hardware components to perform radio frequency conversion. For example, the RF device may comprise a mixer to multiply the baseband signals with a carrier oscillated in the radio frequency of the supported wireless technologies, wherein the radio frequency may be 2.4 GHz, 3.6 GHz, 4.9 GHz, or 5 GHz utilized in the Wi-Fi technology, or another radio frequency, depending on the wireless technology in use.

The primary controller 12 may be a general-purpose processor, a CPU, a Micro Control Unit (MCU), an Application Processor (AP), or a Digital Signal Processor (DSP), which includes various circuits for performing the functions of data processing and computing, controlling the communication device 11 to provide network connections, and reading or writing data and/or program code from or to the storage device 13, and controlling the NSS 14 to accelerate the processing of data packets (i.e., offloading the task of processing data packets to the NSS 14). In addition, the primary controller 12 includes other circuits for providing the functions of packet routing, packet forwarding, traffic control, and/or traffic monitoring.

In particular, the primary controller 12 coordinates the operations of the communication device 11, the storage device 13, and the NSS 14 for performing the traffic management method of the present application. In one embodiment, the primary controller 12 may read and execute program code of an Operating System (OS) and application(s) from the storage device 13, wherein the OS may include various daemons, such as a Network Traffic Management (NTM) daemon.

The storage device 13 is a non-transitory machine-readable storage medium storing computer-executable instructions or program code, including program code of an OS, application(s), and/or communication protocol(s).

In one embodiment, the storage device 13 may be a Double Data Rate Synchronous Dynamic Random Access Memory (DDR SDRAM), in which the term "double data rate" refers to the fact that the DDR SDRAM with a certain clock frequency achieves nearly twice the bandwidth of a Single Data Rate (SDR) SDRAM running at the same clock frequency. In another embodiment, the storage device 13 may be a FLASH memory, a cache memory, another type of memory, or another type of storage medium.

The NSS 14 may also be called a hardware acceleration engine, which is responsible for replacing the primary controller 12 for providing the function(s) of traffic control and/or traffic monitoring. Specifically, the NSS 14 includes a secondary controller 14-1 and a storage device 14-2. The secondary controller 14-1 may be an MCU, an AP, or a DSP, which includes various circuits for performing the functions of data processing and computing, controlling the communication device 11 to provide network connections, and reading or writing data and/or program code from or to the storage device 14-2, and processing data packets (including routing, forwarding, controlling, and/or monitoring of data packets). It should be understood that the components of the NSS 14 described above are for illustrative purposes only, and in another embodiment, the NSS 14 may include more or fewer components. Please note that the NSS 14 mainly servers to reduce the burden on the primary controller 12 and accelerate the processing of data packets, and any hardware acceleration engine that can achieve the same effects may be understood as an example of the NSS 14.

As will be appreciated by persons skilled in the art, the circuits in the primary controller 12 and the secondary controller 14-1 will typically include transistors that are configured in such a way as to control the operation of the circuitry in accordance with the functions and operations described herein. As will be further appreciated, the specific structure or interconnections of the transistors will typically be determined by a compiler, such as a Register Transfer Language (RTL) compiler. RTL compilers may be operated by a processor upon scripts that closely resemble assembly language code, to compile the script into a form that is used for the layout or fabrication of the ultimate circuitry. Indeed, RTL is well known for its role and use in design of electronic and digital systems.

The storage device 14-2 is a non-transitory machine-readable storage medium storing rules for traffic control and computer-executable instructions or program code, including program code of communication protocol(s).

In one embodiment, storage device 14-2 may be a Tightly-Coupled Memory (TCM) which has a higher access rate and lower power consumption than the conventional memory. The storage device 14-2 is generally coupled to the cores of the secondary controller 14-1, and serves as a cache for the secondary controller 14-1. In another embodiment, the storage device 14-2 may be a FLASH memory, a cache memory, another type of memory, or another type of storage medium.

It should be understood that the components described in the embodiment of FIG. 4 are for illustrative purposes only and are not intended to limit the scope of the application. For example, the router 10 may further include a display device (e.g., a Liquid-Crystal Display (LCD), Light-Emitting Diode (LED) display, or Electronic Paper Display (EPD), etc.), and/or an Input/Output (I/O) device (e.g., one or more buttons, a keyboard, a mouse, a touch pad, a video camera, a microphone, or a speaker, etc.).

Figure 5:
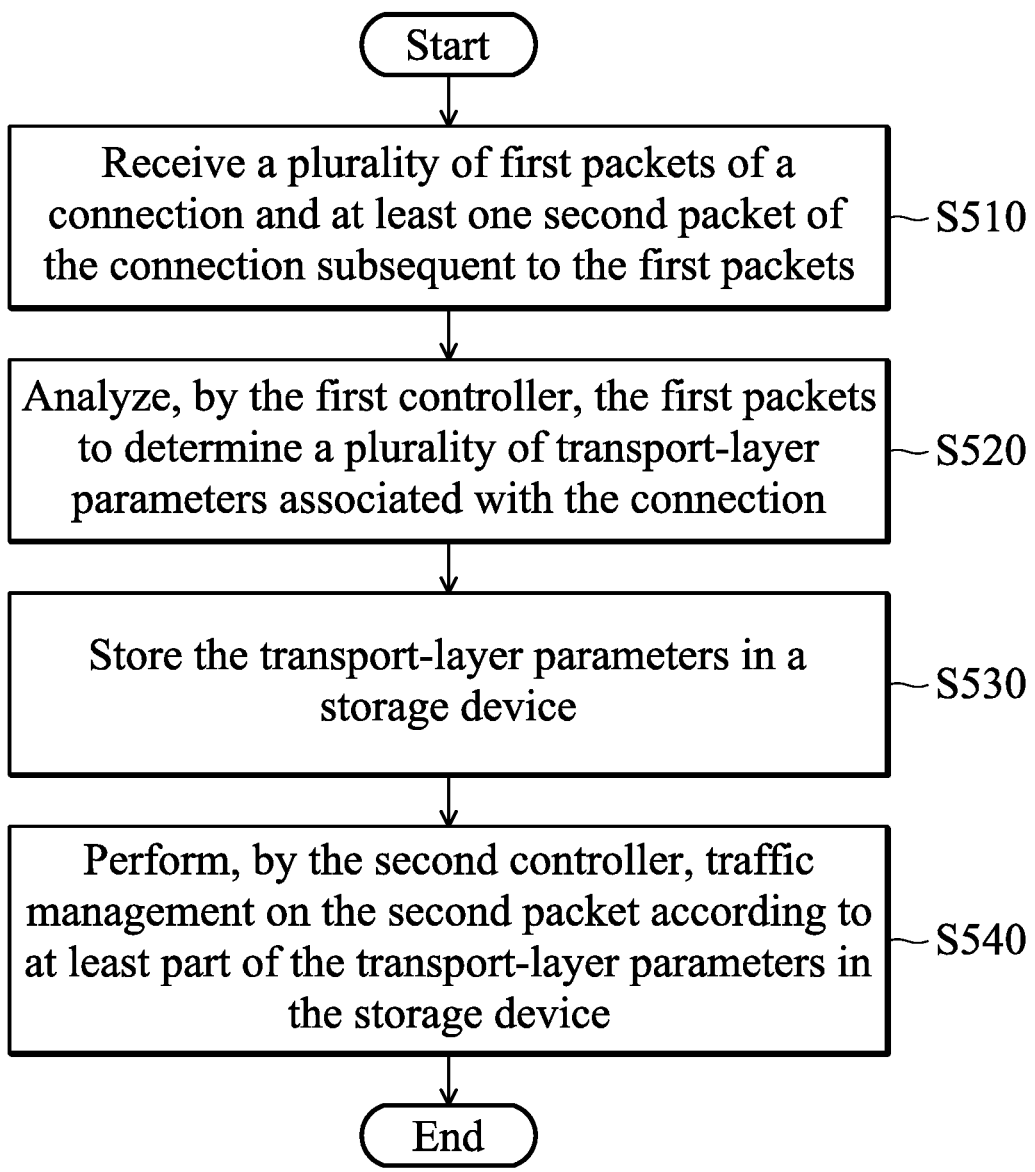
FIG. 5 is a flow chart illustrating the traffic management method according to an embodiment of the application.

FIG. 5 is a flow chart illustrating the traffic management method according to an embodiment of the application. In this embodiment, the traffic management method is applied to a router with dual controllers, e.g., the router 10.

To begin, the router 10 receives a plurality of first packets of a connection and a second packet of the connection subsequent to the first packets (step S510). Next, the primary controller 12 of the router 10 analyzes the first packets to determine a plurality of transport-layer parameters associated with the connection (step S520).

In one or more embodiments, the connection may refer to a state in which two devices communicate with each other through a network, wherein the network may be instantiated by any communication means or standards. When two devices, such as the user device 32 and the network communication device 22, are exchanging information, it may be considered as a connection therebetween being established or having been established, and the exchange of information may refer to transmissions and receptions of data packets between the two devices. In some embodiments, the connection may refer to a state in which information is exchanged between an application (e.g., web browser) executed in a local device (e.g., the user device 32) and a service (e.g., social networking website service) provided by an external server, wherein the exchange of information is also realized by transmissions and receptions of data packets. In one or more embodiments, the present application aims to accelerate the throughput of the router 10 and reduce the burden on the primary controller 12, by using the NSS 14 to perform traffic control and/or traffic monitoring on data packets of connections in certain types.

Specifically, the analysis of the first data packets may include processing the first data packets at the fourth layer of the OSI model, or the transport-layer parameters may further include parameters associated with the first to third layers of the OSI model, i.e., the parameters determined by the primary controller 12 during the processing of the first data packets at the first to third layers of the OSI model. For example, the transport-layer parameters may include at least one of the following: the source and destination IP addresses, the source and destination port numbers, source and destination protocols, total packet count, and total packet size.

Subsequent to step S520, the primary controller 12 stores the transport-layer parameters in the storage device 13 (step S530). After that, the secondary controller 14-1 performs traffic management on the second packet according to at least part of the transport-layer parameters in the storage device 13 (step S540), and the method ends.

In some embodiments, the part of the transport-layer parameters described in step S540 may include the source and destination IP addresses, and the source and destination port numbers. The primary controller 12 is responsible for identifying the source and destination IP addresses and the source and destination port numbers of the connection, and storing these parameters in the storage device 13. After that, the secondary controller 14-1 may perform traffic management on the connection, e.g., monitoring the connection. That is, in such embodiments, the secondary controller 14-1 may directly collect the statistics about the traffic associated with specific IP addresses and ports, without using any application-layer parameters.

In another embodiment, the primary controller 12 may analyze the first data packets to determine a plurality of application-layer parameters associated with the connection, in which the application-layer parameters may include at least one of the following: a rule tag, and an Application (APP) Identification (ID). Specifically, the application-layer parameters may be determined by the primary controller 12 during the processing of the first data packets at the seventh layer of the OSI model. The primary controller 12 may transform at least part of the transport-layer parameters and at least part of the application-layer parameters into one or more rules for the secondary controller 14-1 to perform traffic management on data packets subsequent to the first data packets. For example, assuming that one of the rules indicates monitoring the traffic associated with the Hyper-Text Transfer Protocol (HTTP), the primary controller 12 may first determine the transport-layer parameters and the application-layer parameters associated with a connection once the connection is established. Next, if it is determined that the connection is associated with the HTTP and the IP address associated with the connection is known based on the transport-layer parameters and the application-layer parameters, then the secondary controller 14-1 may follow the rule to perform traffic management, including traffic control, traffic monitoring, and/or packet forwarding, on subsequent data packets of the connection, independent of the primary controller 12. That is, the primary controller 12 no longer takes part in either analyzing subsequent data packets of the connection or performing traffic management on subsequent data packets of the connection.

It should be understood that, in one or more embodiments, the traffic management is independent of the primary controller 12, and the traffic management is performed without putting any burden or hardly any burden on the primary controller 12. That is, it is the secondary controller 14-1 that takes care of all or most of the loading of the traffic management, such as traffic control and traffic monitoring (including updating monitoring statistics to the storage device 13). Later, the user simply needs to query the statistics in the storage device 13 to know the total packet count and/or total packet size associated with a specific application, website, or device.

To further clarify how traffic control and traffic monitoring can be applied without engaging the primary controller 12, detailed description regarding transmission paths of data packets within the router 10 is provided in the following embodiments.

Figure 6:
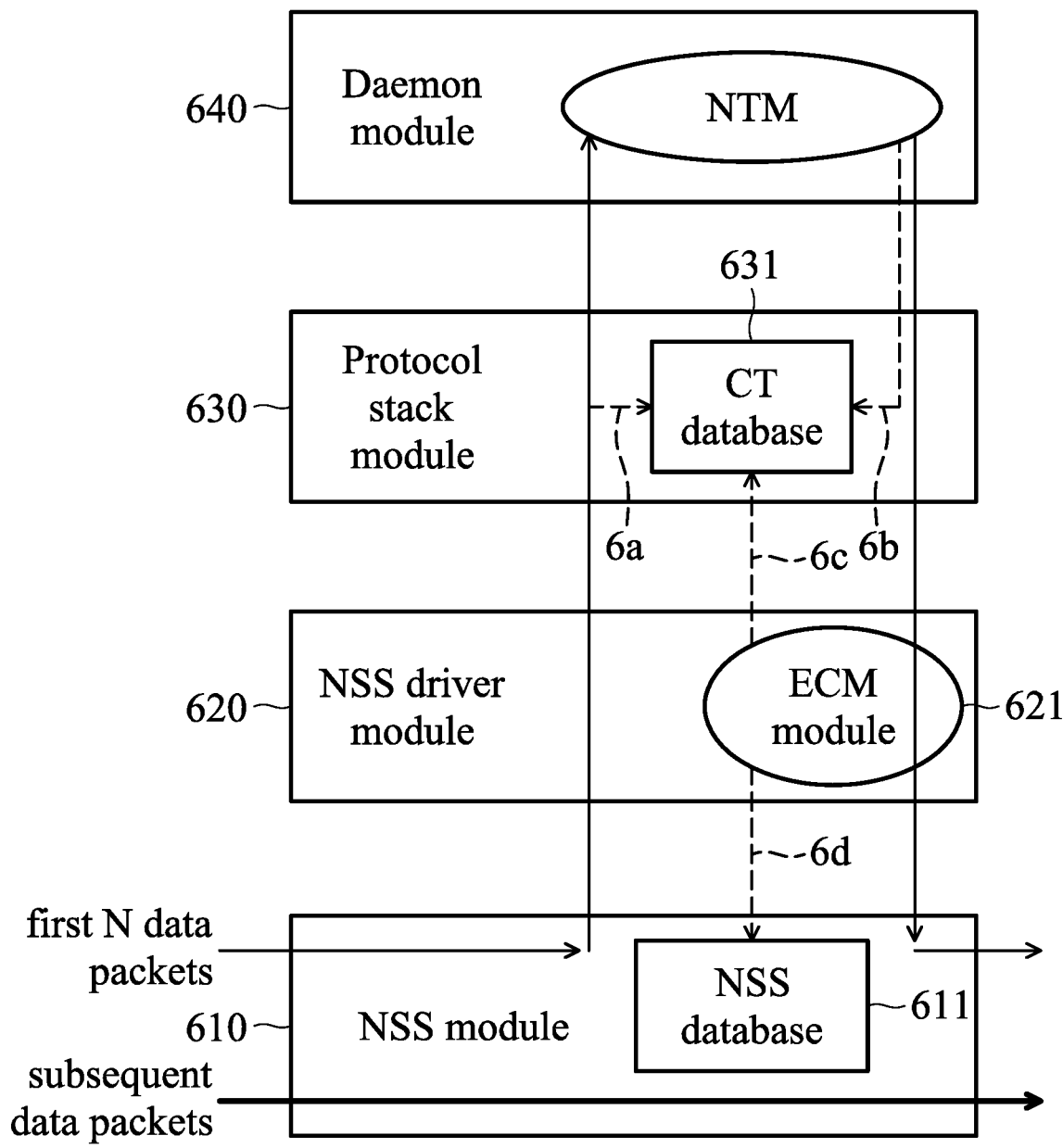
FIG. 6 is a schematic diagram illustrating the operation of traffic control according to an embodiment of the application.

FIG. 6 is a schematic diagram illustrating the operation of traffic control according to an embodiment of the application. In this embodiment, the software architecture to carry out the operation of traffic control includes a NSS module 610, a NSS driver module 620, a protocol stack module 630, and a daemon module 640, wherein each module may be a software module implemented with program code and executed by a controller (e.g., the primary controller 12 or the secondary controller 14-1) to collaborate with each other for performing traffic control. Specifically, the NSS driver module 620, the protocol stack module 630, and the daemon module 640 are executed by the primary controller 12, while the NSS module 610 is executed by the secondary controller 14-1.

In addition, from the perspective of an OS, the NSS module 610, the NSS driver module 620, and the protocol stack module 630 may run in the kernel space of the OS, and the daemon module 640 may run in the user space of the OS.

The NSS module 610 includes a NSS database 611 which stores rules applied for traffic control (also called traffic control rules). For example, the NSS database 611 may be maintained in the storage device 14-2 of FIG. 4.

The NSS driver module 620 includes an Enhanced Connection Manager (ECM) module 621 which determines whether or not to accelerate the processing of data packets by the NSS module 610. That is, if the ECM module 621 determines to accelerate the processing of data packets by the NSS module 610, then the NSS module 610 will handle the subsequent data packets of one or more connections to realize traffic control over the connection(s).

The protocol stack module 630 includes a Connection Track (CT) database 631 which stores the transport-layer parameters and application-layer parameters obtained from analyzing data packets. For example, the CT database 631 may be maintained in the storage device 13 of FIG. 4.

As shown in FIG. 6, the first N data packets (i.e., the first data packets in the embodiment of FIG. 5), one by one, follow the standard path (denoted in light lines) to enter the NSS module 610 and then go up to the NSS driver module 620 and the protocol stack module 630 where the data packets are analyzed layer-by-layer according to the OSI model, in which the data packet analyses includes layers 1 to 4 analyses to determine the transport-layer parameters. The transport-layer parameters may include at least one of the following: the source and destination IP addresses, the source and destination port numbers, the source and destination protocols, the total packet count, and the total packet size (in bytes). During the data packet analyses in the protocol stack module 630, the determined transport-layer parameters are stored in the CT database 631 (step 6a).

Subsequently, the first N data packets go up to the daemon module 640 in which the NTM daemon uses some Deep Packet Inspection (DPI) engines to obtain the application-layer parameters, wherein the DPI engines may refer but not limited to some commercial programs (e.g., PACE, and NBAR, etc.) or some open source libraries (e.g., nDPI, open DPI, L7-filter, and Libprotoident, etc.). While the application has been described by way of an example with the aforementioned modules, it should be understood that the application cannot be limited thereto. For example, the connection-associated parameters may be determined by machine learning techniques, and reference regarding the machine learning techniques may be made to the published thesis—Zhanyi Wang, "The Applications of Deep Learning on Traffic Identification". For illustrative purpose, the following description will be made using the open source libraries 'nDPI' and 'TC' (short for Traffic Control, which is a software module in the Linux core) as examples.

In a specific embodiment, the NTM daemon may call the open source libraries 'nDPI' and 'TC' to determine the application-layer parameters, and transform the application-layer parameters into specific formats and store them in the CT database 631 when encapsulating the headers of the first N data packets and sending them to the protocol stack module 630 (step 6*b*). The application-layer parameters may be processed and transformed in the daemon module 640 into specific formats and then stored in specific fields of the CT database 631. For example, if an application uses the HTTP, the application-layer parameter, APP ID, may be transformed into 0x1 (or another value, such as 0x56, as long as the value is predetermined to correspond to HTTP); or if an application uses the File Transfer Protocol (FTP), the application-layer parameter, APP ID, may be transformed into 0x5; or if an application uses the Secure Shell (SSH), the application-layer parameter, APP ID, may be transformed into 0x15. That is, each protocol used in the application layer corresponds to a respective APP ID, and the transformed application-layer parameters and corresponding transport-layer parameters are stored together in the format of "source IP address=140.112.50.8, destination IP address=192.168.1.211, source port number=80, destination port number=5000, total packet count=N/A, total packet size=N/A, and APP ID=0x1" in the CT database 631. After that, the total packet count and the total packet size in the CT database 631 will be updated by the lower modules (e.g., the NSS driver module 620 and NSS module 610). Thus, the traffic volume for HTTP with the source IP address=140.112.50.8, the destination IP address=192.168.1.211, the source port number=80, and the destination port number=5000 may be identified from the CT database 631 and used for traffic monitoring (detailed description thereof is provided below in the embodiment of FIG. 7).

The NTM daemon is capable of performing layer 7 analysis of the data packets to distinguish data packets of one application from data packets of another application. In addition, the NTM daemon is capable of controlling the configurations of different applications. For example, the NTM daemon may selectively adjust the data transfer rate of Skype.

The open source library 'nDPI' is an open and extensive library for deep packet inspection, which is responsible for providing the function of packet filtering to check if a data packet conforms to a predetermined protocol or if a data packet contains a virus or is associated with a spam mail or hacking activity, or to check data packets for collecting statistics thereof (i.e., traffic monitoring). The open source library 'TC' is a library for traffic control, which is responsible for configuring the packet scheduler and performing the operations of traffic control, including packet prioritizing, traffic shaping, bandwidth limiting, and Quality of Service (QoS) control, etc.

In one embodiment, the open source library 'nDPI' may be able to identify which application a connection belongs to by analyzing no more than 10 data packets of the connection. That is, the aforementioned number N may be expected to be less than or equal to 10.

The application-layer parameters include at least one of the following: a rule tag, and an APP ID, wherein the APP ID is used to indicate the application with which a data packet is associated, and the rule tag is used to indicate whether the application with which a data packet is associated has been identified. If the application with which a data packet is associated has been identified, the rule tag of the data packet and each subsequent data packet of the same connection will be set to TRUE (default value is FALSE) by the NTM daemon in the daemon module 640. Next, the NSS module 610 may be configured to accelerate the processing of the data packets, if the rule tag is set to TRUE. For example, the application with large traffic volume is preferably configured to use the acceleration path (denoted in heavy lines), so that the processing of data packets may be offloaded to the secondary controller 14-1 to reduce the burden on the primary controller 12.

It should be noted that, in addition to storing the transport-layer parameters and at least part of the application-layer parameters, the CT database 631 also stores traffic control rules which are used to control the traffic (e.g., to limit the bandwidth) of certain applications, websites, or devices. In one embodiment, a traffic control rule may be defined according to a Quality of Service (QoS) parameter of a connection, wherein the QoS parameter may indicate the QoS configuration of a connection to the NSS driver module 620, and different QoS parameters may correspond to different transceiving rates. More specifically, if a user wishes to limit the bandwidth of an application, the configuration of the bandwidth limit may be transformed into a QoS parameter. For example, when a data packet of an application which is configured with a bandwidth limit enters the daemon module 640, the NTM daemon queries the user's configuration of the bandwidth limit (e.g., whether or not to limit the bandwidth of the traffic associated with a certain source/destination IP address or a certain application) and accordingly determines whether or not to limit the bandwidth of the connection to which the data packet belongs. If it is determined to limit the bandwidth of the connection, the NTM daemon stores the APP ID and the QoS parameter into the CT database 631. Otherwise, if it is determined not to limit the bandwidth of the connection, then the NTM daemon stores only the APP ID into the CT database 631.

In one embodiment, a QoS parameter may indicate a guaranteed transceiving rate, an average transceiving rate, or a maximum tolerated latency, etc. The QoS parameter is stored in the CT database 631, and is used to indicate the QoS requirement of a connection.

Referring back to FIG. 6, subsequent to step 6*b*, the protocol stack module 630 passes the data packets, one by one, to the NSS driver module 620 when finishing encapsulating the headers of the data packets, the ECM module 621 first determines whether the rule tag of each data packet is set to 'true'. In one embodiment, a rule tag is set to 'true' when the daemon module 640 obtains the application-layer parameter (e.g., the APP ID), of the connection to which the currently processed data packet belongs. If the rule tag is set to 'true', the ECM module 621 queries the CT database 631 about the transport-layer parameters and traffic control rule(s) associated with the connection to which the currently processed data packet belongs (step 6*c*), and then stores the transport-layer parameters and traffic control rule(s) into the NSS database 611 (step 6*d*).

After that, NSS module 610 performs routing and forwarding of the data packets, and then performs traffic control on subsequent data packets of the connection (denoted in heavy lines) according to the transport-layer parameters and traffic control rule(s) stored in the NSS database 611, instead of passing subsequent data packets of the connection to be processed by the NSS driver module 620, the protocol stack module 630, and the daemon module 640.

In other words, the rule tag being set to 'true' triggers the ECM module 621 to store the transport-layer parameters and traffic control rule(s) into the NSS database 611, so as to enable the NSS module 610 to perform traffic control on subsequent data packets of the connection.

Alternatively, in addition to performing traffic control on subsequent data packets of the connection, the NSS module 610 may also perform traffic monitoring on subsequent data packets of the connection and periodically updates the monitored statistics (e.g., the total packet count and/or the total packet size) into the CT database 631.

In some embodiments, if there's no traffic control rule (e.g., a QoS parameter) for the connection in the CT database 631, the NSS module 610 may only perform traffic monitoring on subsequent data packets (e.g., the second data packet in step S530) of the connection due to there being no traffic control rule available.

Figure 7:
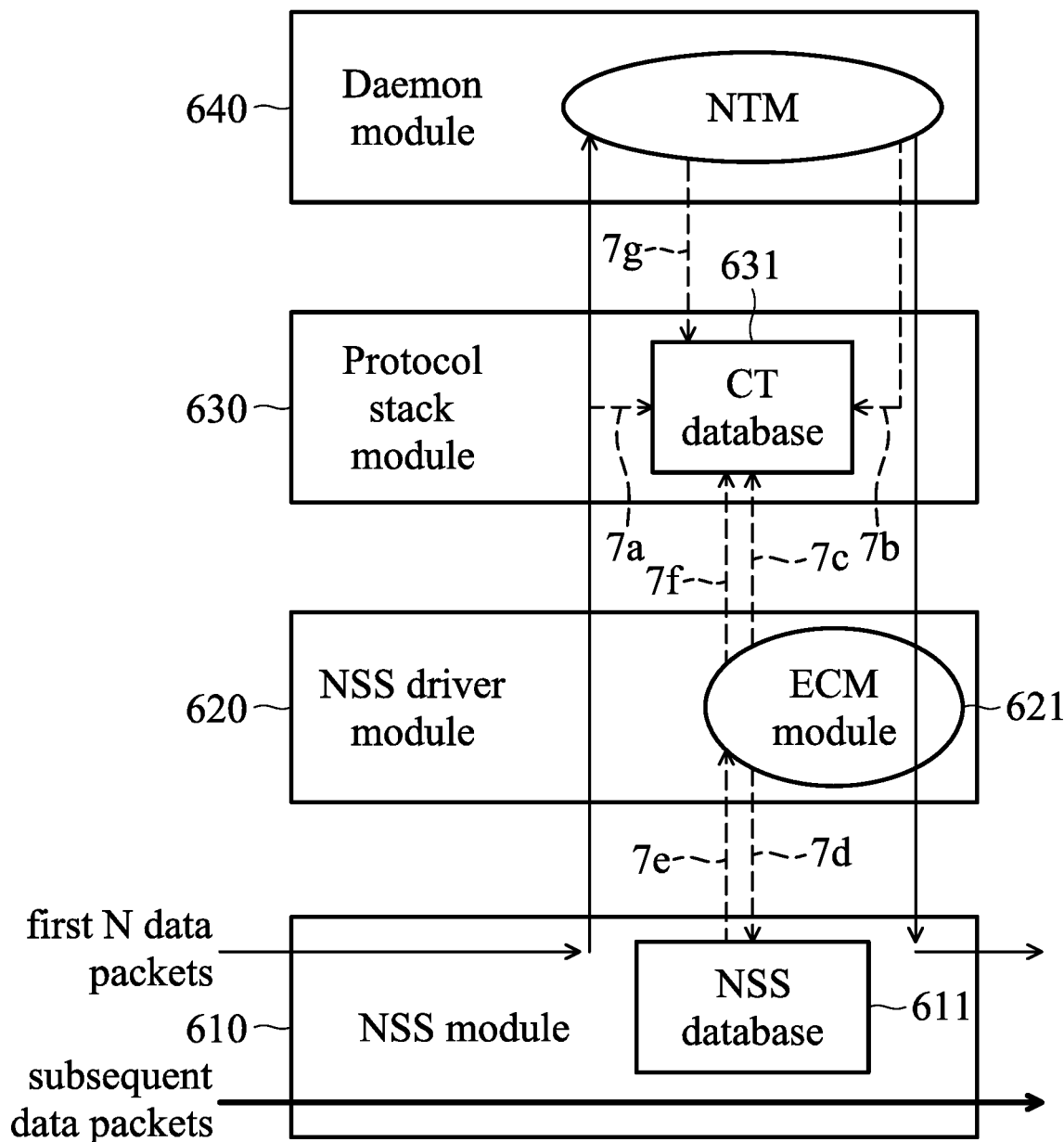
FIG. 7 is a schematic diagram illustrating the operation of traffic monitoring according to an embodiment of the application.

FIG. 7 is a schematic diagram illustrating the operation of traffic monitoring according to an embodiment of the application. In this embodiment, the software architecture to carry out the operation of traffic monitoring is the same as the software architecture in FIG. 6, and steps 7a and 7b are the same as steps 6a and 6b in FIG. 6. The detailed description of steps 7a and 7b is not repeated herein for brevity and reference may be made to the embodiment of FIG. 6.

Subsequent to step 7b, the protocol stack module 630 passes the data packets, one by one, to the NSS driver module 620 when finishing encapsulating the headers of the data packets, the ECM module 621 first determines whether the rule tag of each data packet is set to 'true'. If the rule tag is set to 'true', the ECM module 621 queries the updated CT database 631 about the transport-layer parameters associated with the connection to which the currently processed data packet belongs (step 7c), and then stores the transport-layer parameters into the NSS database 611 (step 7d), to enable the NSS module 610 to process subsequent data packets of the connection.

Next, the NSS module 610 performs traffic monitoring on the connection and periodically updates the monitored traffic information, via the ECM module 621 (step 7e), to the CT database 631 (step 7f). In one embodiment, the traffic information may be stored in the format of [IP address(es), port number(s), QoS parameter, traffic volume, APP ID] into the CT database 631, wherein the NSS module 610 keeps updating the traffic information, including the IP address(es), port number(s), and traffic volume, during traffic monitoring. Consequently, the NSS module 610 may be solely in charge of performing traffic monitoring on the connection, without identifying the application-layer parameters (e.g., APP ID), and the primary controller 12 does not need to analyze the application-layer parameters.

Specifically, the NSS module 610 may perform traffic monitoring on subsequent data packets of the connection according to the transport-layer parameters (e.g., source/destination IP address, and/or port number(s)) stored in the NSS database 611. For example, the traffic monitoring may include periodically monitoring the total packet count and/or total packet size (in bytes) of a specific connection, and reporting the monitored traffic information to the ECM module 621 (step 7e). The ECM module 621 then collates the traffic information and updates the collated traffic information into the CT database 631 (step 7f).

After that, when a user queries the traffic information, the NTM daemon in the daemon module 640 retrieves the traffic information from the CT database 631 (step 7g). Specifically, the NTM daemon first determines the target device or target application of this query, and then looks up the CT database 631 to obtain the traffic information associated with the target device or target application. Please note that, during the traffic monitoring, the primary controller 12 does not need to analyze subsequent data packets for determining application-layer parameters, and the secondary controller 14-1 does not need to identify or use the application-layer parameters stored in the CT database 631.

As shown in FIG. 7, only the first N data packets follow the standard path (denoted in light lines), while subsequent data packets follow the acceleration path (denoted in heavy lines) where the NSS module 610 may directly perform traffic monitoring on subsequent data packets of the connection without passing them to be processed by the NSS driver module 620, the protocol stack module 630, and the daemon module 640.

In view of the forgoing embodiments of FIGS. 6 and 7, it will be appreciated that the present application proposes a dual-controller architecture to improve the throughput of a router, by aggregating the multi-layer parameters associated with a connection to allow only the first N (N≤10) data packets of the connection to follow the standard path where the primary controller is responsible for traffic control and/or traffic monitoring, while allowing the subsequent data packet of the connection to follow the acceleration path where the secondary controller (or may be referred to as the NSS) is responsible for packet routing/forwarding, traffic control, and/or traffic monitoring. Advantageously, the computing and processing resources of the primary controller may be saved and the throughput of the router may be significantly increased.

While the application has been described by way of example and in terms of preferred embodiment, it should be understood that the application cannot be limited thereto. Those who are skilled in this technology can still make various alterations and modifications without departing from the scope and spirit of this application. Therefore, the scope of the present application shall be defined and protected by the following claims and their equivalents.

Note that use of ordinal terms such as "first", "second", etc., in the claims to modify a claim element does not by itself connote any priority, precedence, or order of one claim element over another or the temporal order in which acts of the method are performed, but are used merely as labels to distinguish one claim element having a certain name from another element having the same name (except for use of ordinal terms), to distinguish the claim elements.

What is claimed is:

1. A router, comprising:
  a communication device, configured to receive a plurality of first packets of a connection and at least one second packet of the connection subsequent to the first packets; and
  a first processor, coupled to the communication device, and configured to analyze the first packets to determine at least part of a plurality of transport-layer parameters associated with the connection, receive a traffic control rule associated with the connection, and offload processing of the at least one second packet of the connection to a second processor after the at least part of the transport-layer parameters is determined,
  wherein the first processor queries a first storage device, which is coupled to the first processor, about the transport-layer parameters associated with the connection in response to a rule tag of the at least one second packet being determined, and stores the transport-layer parameters and the traffic control rule into a second storage device which is coupled to the second processor and different from the first storage device, and
  wherein the second processor is configured to perform traffic control on the at least one second packet according to the traffic control rule and the at least part of the transport-layer parameters stored in the second storage device.

2. The router as claimed in claim 1, wherein the traffic control is performed independent of the first processor.

3. The router as claimed in claim 1, wherein the traffic control rule comprises a Quality of Service (QoS) parameter associated with the connection.

4. The router as claimed in claim 1, wherein the transport-layer parameters comprise at least one of the following:
   a source Internet Protocol (IP) address and a destination IP address;
   a source port number and a destination port number; and
   a source protocol and a destination protocol.

5. The router as claimed in claim 1, wherein the first processor sets the rule tag to TRUE when determining an application identification associated with the connection, so as to enable the second processor to perform the traffic control independent of the first processor.

6. The router as claimed in claim 5, wherein the second processor is further configured to forward the at least one second packet in response to the rule tag being set to TRUE.

7. The router as claimed in claim 1, wherein the first storage device and the second storage device are configured to respectively store computer-executable instructions or program codes that are at least partially different between the first and second storage devices.

8. A traffic control method for a router comprising a first processor and a second processor which is different than the first processor, the traffic control method comprising:
   receiving a plurality of first packets of a connection and at least one second packet of the connection subsequent to the first packets;
   receiving a traffic control rule associated with the connection;
   querying, by the first processor, a first storage device, which is coupled to the first processor, about transport-layer parameters associated with the connection in response to a rule tag of the at least one second packet being determined;
   storing the transport-layer parameters and the traffic control rule into a second storage device which is coupled to the second processor and different from the first storage device;
   offloading, by the first processor, processing of the at least one second packet of the connection to the second processor after at least part of the transport-layer parameters associated with the connection is determined; and
   performing, by the second processor, traffic control on the at least one second packet according to the traffic control rule and the at least part of the transport-layer parameters stored in the second storage device.

9. The traffic control method as claimed in claim 8, wherein the traffic control is performed independent of the first processor.

10. The traffic control method as claimed in claim 8, wherein the traffic control rule comprises a QoS parameter associated with the connection.

11. The traffic control method as claimed in claim 8, wherein the transport-layer parameters comprise at least one of the following:
    a source Internet Protocol (IP) address and a destination IP address;
    a source port number and a destination port number; and
    a source protocol and a destination protocol.

12. The traffic control method as claimed in claim 8, further comprising:
    setting, by the first processor, the rule tag to TRUE when determining an application identification associated with the connection; and
    offloading the processing of the at least one second packet of the connection to the second processor in response to the rule tag being set to TRUE.

* * * * *